Nov. 18, 1958  C. R. BAYLESS ET AL  2,860,655
LIQUID STORAGE

Filed Feb. 28, 1956  2 Sheets-Sheet 2

INVENTORS
CHARLES R. BAYLESS, DECEASED,
BY DAISY M.B. BAYLESS, EXECUTRIX
JOSEPH W. DAUGHTREY
MELBORNE L. ROBERTSON
BY

THEIR ATTORNEY

United States Patent Office 2,860,655
Patented Nov. 18, 1958

2,860,655
LIQUID STORAGE

Charles R. Bayless, deceased, late of Channelview, Tex., by Daisy M. B. Bayless, executrix, Channelview, Joseph W. Daughtrey, Pasadena, and Melborne L. Robertson, Laird Hill, Tex., assignors to Gulf Oil Corporation, Pittsburgh, Pa., a corporation of Pennsylvania Application February 28, 1956, Serial No. 568,214

12 Claims. (Cl. 137—122)

This application relates to new and useful improvements in apparatus for automatically controlling the supply of liquid to a multiple-unit storage facility and the sequential filling of selected storage units with supplied liquid. More particularly, the present invention relates to improvements in apparatus of the same general type disclosed in application Serial No. 320,262, filed November 13, 1952, by Melborne L. Robertson, now Patent No. 2,779,348 dated Jan. 29, 1957, and entitled "Fluid Production and Storage Control Apparatus."

Broadly, the invention pertains to apparatus for controlling the introduction of liquid into a plurality of storage tanks in a selective fashion and comprises a plurality of electrically controlled valves that are open solely during energization thereof with the number of such valves being equal to the number of storage tanks with which the apparatus is to be used. A liquid-level-responsive-electric-switch means is associated with each valve, and a pair of normally open, electric-selector switches is associated with each valve. In addition, the apparatus includes switch-actuating means responsive to electrical energization thereof to sequentially and cyclically close the pairs of selector switches. The apparatus also comprises an electric relay including a solenoid and a normally closed relay switch. An electrical circuit is provided to control the energization of the solenoid comprising each valve having an associated circuit branch including, in series, the switch means and one of the pair of selector switches associated with such valve, with such circuit branches being in parallel with each other and in series with the solenoid. The switch-actuating means is energized by a circuit that includes the relay switch. Each of the valves is energized by an electric circuit that includes, in series, the switch means and the other of the pair of selector switches associated therewith.

The invention also comprises the pairs of selector switches, the relay, and the switch-actuating means being immersed in transformer oil and housed in a vapor-tight housing to minimize the effects of corrosion and to lessen any possibility of a fire or explosion being initiated by such electrical components.

The invention also involves an electrical arrangement wherein all electrical loads are in parallel rather than any two of the same being in series.

Better appreciation of these and other features to which the invention pertains will be had upon reference to the following description of preferred invention embodiments and accompanying drawings, wherein.

Figure 1:
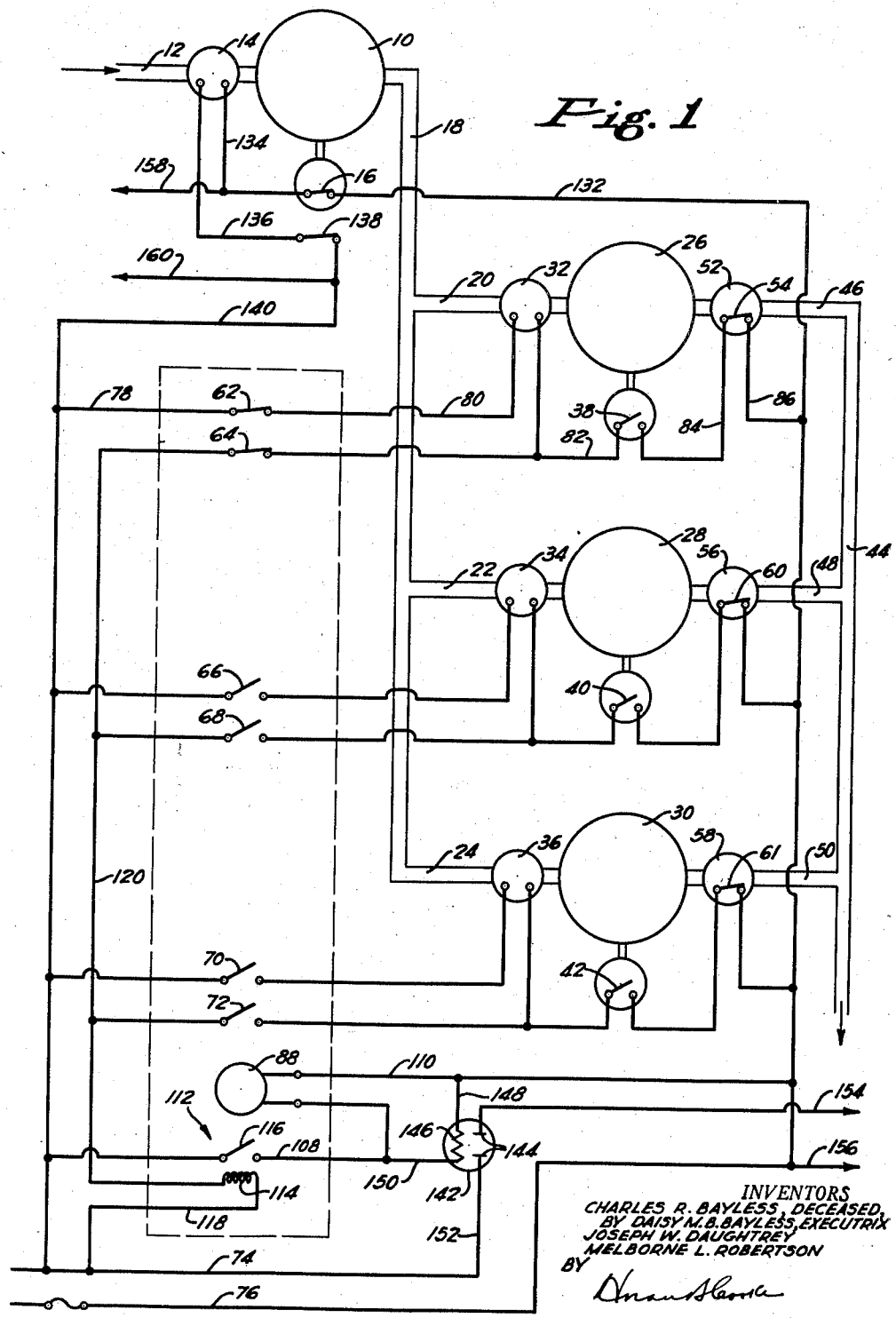
Figure 1 is a schematic representation of the invention as applied to the control of the passage of crude petroleum through a separator and thence storing the same in a tank battery.

Referring now to Figure 1, the numeral 10 designates a separator tank that is supplied crude oil by a pipe 12 provided with a normally closed, electrically actuated valve 14 that can be of the conventional hydromotor type. The valve 14 is of conventional character and is of the type that opens in response to being electrically energized and remains open solely for the duration of such electrical energization.

The separator tank 10 is provided with a liquid-level-responsive switch 16 (this switch can be a conventional float-actuated switch) which is closed whenever the liquid level within the tank is below a predetermined level and vice versa. The separator tank discharges into a further pipe 18 provided with branch pipes 20, 22, and 24 arranged to supply crude oil to the storage tanks 26, 28, and 30, respectively. The branch pipes 20, 22, and 24 are provided, respectively, with normally closed, electrically actuated inlet valves 32, 34, and 36 that function in the same manner and can be of the same type as the previously described valve 14. Also, the tanks 26, 28, and 30 are respectively provided with liquid-level-responsive switches 38, 40, and 42, which can be of the float-actuated type. Switches 38, 40, and 42 are closed whenever the liquid level within their respective tanks is below a predetermined level and vice versa. The arrangement is such that whenever one of the tanks is filled, its associated liquid-level-responsive switch is open.

A tank battery discharge pipe 44 is connected to the tanks 26, 28, and 30 by branch pipes 46, 48, and 50, respectively. The branch pipe 46 is provided with an outlet valve 52 of conventional character, having operatively associated therewith in a conventional manner an electric switch 54; such valve 52 and switch 54 being related in such a manner that they open and close together, with the switch 54 being closed only when the valve 52 is closed. In a corresponding manner, the branch pipes 48 and 50 are respectively provided with outlet valves 56 and 58 and switches 60 and 61.

Electrical means is provided for selecting from among the tanks 26, 28, and 30 one which is in readiness to be filled, then opening the inlet valve of such selected tank until such tank has been filled, and thereafter selecting another tank in readiness to be filled, etc. By the expression "a tank in readiness to be filled" is meant a tank that is not full and which has its outlet valve closed. Such means comprises a pair of normally open micro switches 62 and 64 that open and close in unison associated with tank 26, a pair of normally open micro switches 66 and 68 that open and close in unison associated with the tank 28, and a pair of normally open micro switches 70 and 72 that open and close in unison associated with the tank 30.

Of the pair of micro switches associated with each tank, one of the same is connected in electrical series with the inlet valve, the liquid-level-responsive switch, and the switch of the outlet valve associated with such tank between a pair of fused power leads 74 and 76. In the case of tank 26, such series arrangement comprises a lead 78 connected between the power lead 74 and the switch 62, a lead 80 connected between the switch 62 and the inlet valve 32, a lead 82 connected between the inlet valve 32 and the liquid-level-responsive switch 38, a lead 84 connected between the liquid-level-responsive switch 38 and the switch 54, and a lead 86 connected between the switch 54 and the power lead 76. With this arrangement, the inlet valve 32 is energized and therefore open solely upon the concurrence of switch 62 being closed, liquid-level-responsive switch 38 being closed and switch 54 being closed. Switches 66 and 70 function in an analogous manner to control the energization of inlet valves 34 and 36 of the tanks 28 and 30.

Figure 3:
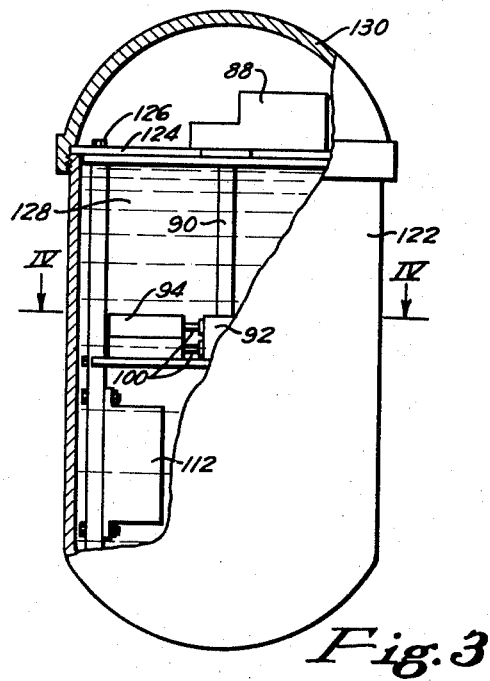
Figure 3 is an elevational view of the micro-switch-actuating means with a portion of the housing therefor being broken away; and, Figure 4 is a horizontal sectional view taken upon the plane of the section line IV—IV of Figure 3.
Figure 4:
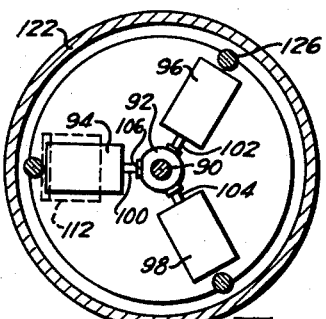

Means is provided for sequentially and cyclically closing the pairs of micro switches 62 and 64, 66 and 68, and 70 and 72 in the order enumerated. Such means are illustrated best in Figures 3 and 4, and comprise an electric motor 88 that drives a shaft 90 on which there is mounted cam 92. Radially disposed about the cam 92 are casings 94, 96, and 98 which enclose respectively the pairs of micro switches 62 and 64, 66 and 68, and 70 and 72. Associated respectively with the casings 94, 96, and 98 are pairs of radially reciprocable switch-actuating plungers 100, 102, and 104 which are yieldingly urged from their respective casings into engagement with the cam 92. The casings together with their associated plungers and the micro switches contained therein are of conventional character, and function in such a manner that outward movement of the plungers from a retracted position within the casing causes closure of the switches contained therein, while inward plunger movement causes opening of such switches. It will therefore be seen upon inspection of Figure 4 that the cam 92 is in a position presenting its flattened side 106 towards the casing 94 so that the plungers 100 are extended from the casing 94 to a relatively greater extent than the plungers 102 and 104. Thus, with the cam 92 in the position shown in Figure 4, micro switches 62 and 64 contained within the casing 94 are closed, while the pairs of micro switches 66 and 68, and 70 and 72 contained within the casings 96 and 98 are open. It will also be evident upon inspection of Figure 4 that clockwise rotation of the cam 92 will sequentially and cyclically cause closure of the pairs of micro switches 62 and 64, 66 and 68, and 70 and 72. It should also be noted that the arrangement is such that the cam 92 is contoured so that only one pair of micro switches is closed at any single time, some extent of angular rotation of the cam 92 occurring between the opening of one pair of switches and the closing of the next pair of switches.

It will further be understood that the electric motor 88 can include reduction gearing so that the cam 92 will not rotate at an excessive velocity, and that the cam 92 will be driven at a substantially constant velocity that will require a predetermined time to complete one revolution.

The electric motor 88 is energized by electrical leads 108 and 110 connected between the motor 88 and the power leads 74 and 76. Means is provided for interrupting energization of the electric motor 88 which comprises a relay 112 including a solenoid 114 and a normally closed relay switch 116 that is opened solely during energization of the solenoid 114. The solenoid 114 is electrically so arranged as to be energized solely upon the occurrence of a pair of micro switches being closed that are associated with a tank in readiness to be filled. With respect to the storage tank 26, such electric arrangement of the solenoid 114 comprises one terminal of the solenoid being connected to the power lead 74 by a lead 118, and its other terminal connected by a lead 120 to the lead 82 through the micro switch 64. With this arrangement, it will be apparent that upon the concurrence of the switch 54 being closed, the liquid-level-responsive switch 38 being closed, and the switch 64 being closed, a circuit that includes the solenoid 114 is closed between the power leads 74 and 76 that includes leads 118, 120, 82, 84, and 86. In an analogous manner, with respect to the storage tanks 28 and 30, the solenoid 114 is connected to the micro switches 68 and 72.

Referring again to Figures 3 and 4, it will be noted that the micro switch casings 94, 96, and 98 together with their contained pairs of micro switches, the pairs of swicth- actuating plungers 100, 102 and 104, the cam 92, and the relay 112 are disposed within a vapor-tight housing 122 that includes an inner cover 124 that is detachably secured by fastening means 126. The interior of the housing 122 beneath the inner cover 124 is filled with transformer oil 128 so that the relay 112, the switch casings 94, 96, and 98 together with the pairs of plungers 100, 102 and 104, and the cam 92 are immersed in the transformer oil 128. Such an arrangement avoids any deleterious effects upon the components contained within the housing 122 that can be caused by a corrosive environment (such as the atmosphere at exposed positions along a sea coast), and substantially reduces any risk of an electrical spark igniting inflammable vapors.

The electric motor 88 is mounted upon the inner cover 124 of the housing 122, with the shaft 90 that is driven by the motor 88 being journaled through a suitable seal in the inner cover 124. An outer cover 130 is detachably secured to the balance of the vapor-tight housing 122 to shield the motor 88.

The valve 14 that controls the supply of crude oil to the separator tank 10 is supplied electrical energization by a circuit comprising a lead 132, the liquid-level-responsive switch 16, a lead 134, the valve 14, lead 136, a normally closed, manually operated electric switch 138, lead 140, and the lead 78. This arrangement causes electrical energization of the valve 14 whenever both the switches 16 and 138 are closed, with such valve being de-energized when either the switches 16 or 138 is opened.

A conventional amperite-time-delay tube 142 that includes a pair of normally closed contacts 144 and heater element 146 is provided with the element 146 connected in electrical parallel with the motor 88 by leads 148 and 150. One of the contacts 144 is connected to the power lead 74 by a lead 152, and the other of such contacts 144 is connected to a lead 154. The lead 154 together with a lead 156 that is connected to power lead 76 constitutes leads that can be used in conjunction with apparatus of the type disclosed in the previously mentioned pending patent application for controlling oil-field production, inasmuch as the amperite tube 142 has a time-delay value slightly in excess of the time that is required for the cam 92 to make a single complete revolution during continuous energization of the electric motor 88. As will be seen presently, such continuous energization of the motor 88 can only occur when none of the tanks is in readiness to be filled. The manner in which the leads 154 and 156 can be used for controlling field production or, more specifically, for curtailing field production that is supplied through pipe 12 to the separator tank 10 can comprise connecting the latter-mentioned leads to the solenoid 398 in lieu of the leads 437 and 438 of the previously mentioned pending application. The function of such an arrangement is that field production would be curtailed in response to operation of the amperite-time-delay tube solely during the time that the contacts 144 are open. It will be understood that while the contacts 144 of the amperite tube 142 open after a predetermined period of energization of the element 146, it is also the function of the contacts 144 to close subsequent to de-energization of the element 146; the duration of the time interval in this instance is not critical, and can be as short as desired.

Alternatively, leads 158 and 160 that are connected to the leads 134 and 140 can be used in lieu of the leads 154 and 156 for controlling field production, it being noted that an electrical potential difference will exist at all times between the leads 158 and 160 except when the separator tank 10 has been sufficiently filled to cause opening of the liquid-level-response switch 16. Another alternative arrangement for controlling field production can be employed such that opening of the contacts 144 or the opening of the liquid-level-responsive switch 16 will curtail field production. This latter-mentioned alternative arrangement comprises connecting the leads 154 and 158 to the solenoid 398 of the previously mentioned pending application in lieu of the leads 437 and 438.

In operation, the manual switch 138 will be closed and as an initial condition it can be assumed that the separator tank 10 as well as the storage tanks 26, 28, and 30 are empty. Further, it is assumed that the outlet valves 52, 56 and 58 are closed. It can also be assumed as an initial condition that all of the pairs of micro switches 62 and 64, 66 and 68, and 70 and 72 are open. With such an assumed starting condition, the valve 14 will be energized from its normally closed position to its open position thereby admitting crude oil into the separator tank 10 through the pipe 12 prior to flowing to the tanks 26, 28 and 30. Also, the electric motor 88 will be energized to rotate the cam 92, inasmuch as all of the micro switches 64, 68, and 72 are open and the relay switch 116 is closed.

The electric motor 88 will continue to be energized until the cam 92 has been rotated to a position closing one of the pairs of micro switches, and it can be assumed that the first pair of micro switches to be so closed will be the switches 62 and 64. Upon closure of the pair of micro switches 62 and 64, the relay solenoid 114 will be energized to open the relay switch 116, and thereby de-energize the electric motor 88 to stop the cam 92 in a position closing switches 62 and 64, since the liquid-level-responsive switch 38 is closed and the switch 54 is also closed. In addition, as the latter-mentioned switches are closed, as well as the micro switch 62, the inlet valve 32 is energized from its normally closed position to its open position so as to admit crude oil into storage tank 26. It should be noted that even though switches 62 and 64 are closed, neither the inlet valve 32 or the solenoid 114 would be energized should either the liquid-level-responsive switch 38 or the switch 54 be open. If either of the latter-mentioned switches were open, the cam 92 would at least be driven continuously to a position closing micro switches 66 and 68.

The electric motor 88 will remain de-energized and the micro switches 62 and 64 will remain closed until the liquid-level-responsive switch 38 has been opened as a consequence of the tank 26 becoming full. Upon opening of the liquid-level-responsive switch 38, the relay solenoid 114 is de-energized so that relay switch 116 resumes its normally closed position energizing the electric motor 88, and the valve 32 is de-energized so that it closes. The electric motor 88 will remain energized until it has driven the cam 92 through successive positions opening the pair of micro switches 62 and 64 and closing the pair of micro switches 66 and 68. Upon the cam 92 reaching the latter position, the solenoid 114 is again energized due to the concurrence of micro switch 68 being closed, the liquid-level-responsive switch 40 being closed, and the switch 60 being closed. Also, upon the concurrence of the two latter switches being closed as well as the micro switch 66 being closed, the inlet valve 34 is energized to its open position.

Both the inlet valve 34 and the relay solenoid 114 will remain energized until such time as the liquid-level-responsive switch 40 opens whereupon both the valve 34 and the solenoid are de-energized thereby causing valve 34 and the relay switch 116 to close. The electric motor 88 will then drive the cam 92 to a position closing the micro switches 70 and 72 after the micro switches 66 and 68 are opened. From the foregoing, it will be evident that upon closure of the micro switches 70 and 72, the electric motor will be de-energized and the inlet valve 36 opened until such time as the tank 30 has become filled sufficiently to open the liquid-level-responsive switch 42.

Upon opening of the liquid-level-responsive switch 42, the electric motor 88 is energized until the cam 92 has again closed the pair of micro switches 62 and 64. Solenoid 114 and the inlet valve 132 will be energized upon closure of the micro switches 62 and 64 only in the event that both the liquid-level-responsive switch 38 and the switch 54 are closed. In the event that either of the latter-mentioned switches are open, the solenoid 114 and the inlet valve 132 remain de-energized and the electric motor 88 will remain continuously energized until at least such time as the pair of micro switches 66 and 68 are closed.

From the foregoing, the sequential and cyclic tank selecting and filling function can be clearly understood. It will be evident that the electric motor 88 is continuously energized at all times to sequentially and cyclically close the pairs of micro switches 62 and 64, 66 and 68, and 70 and 72, except whenever a pair of micro switches are closed that are associated with a tank having its associated liquid-level-responsive switch closed as well as the switch associated with the outlet valve of the tank. Accordingly, recalling that a storage tank is in readiness to be filled solely whenever its associated liquid-level-responsive switch as well as the switch associated with its outlet valve are closed, the apparatus can be said to have an overall function as selecting a tank in readiness to be filled, filling such selected tank and thereafter selecting another tank, etc., with such selections being made preferentially according to a predetermined sequential order of storage tanks in a cyclic manner. It perhaps has been noted that the preceding discussion has tacitly assumed that an interruption of the supply of electrical energy to the power leads 74 and 76 will not occur. This assumption does not introduce any difficulty, as the occurrence of a power failure will not alter the described sequence of operation, but simply interrupt the same for the duration of the power failure. This is true for the reason that a power failure causes closure of the valves 14, 32, 34, and 36, and results in the cam 92 remaining in the position occupied by the same at the instant that the power failure occurs. Also, it will be observed that with the field production control apparatus of the previously mentioned pending application, a power failure curtails production.

Occasionally, the situation may arise where none of the storage tanks 26, 28, and 30 is in readiness to be filled. In such a situation, it will be apparent that the electric motor 88 will be continuously energized. Should none of the storage tanks be in readiness to be filled resulting in the continuous energization of the electric motor 88 for a time interval slightly in excess of that required for the cam 92 to make one complete revolution, the amperite-time-delay tube 142 will function to cause opening of the contacts 144 so that there is no electrical potential between the leads 154 and 156. This results in field production that supplies crude oil to the separator tank 10 being curtailed whenever the leads 154 and 156 or the leads 154 and 158 are utilized in the previously described manner with the apparatus of the pending application. The electric motor 88 will remain continuously energized until the cam 92 driven thereby has closed a pair of micro switches associated with a storage tank that is in readiness to be filled, whereupon the motor 88 as well as the heater element 146 of the amperite-time-delay tube 142 become de-energized. De-energization of the amperite tube 142 results in closure of the contacts 144 so that field production supplying crude oil to the separator tank 10 is resumed.

If at any time during the operation of the apparatus, the separator tank 10 becomes filled sufficiently to cause the liquid-level-responsive switch 16 to open, valve 14 is de-energized so that it returns to its normally closed position; and in addition the previously existing electrical potential between the leads 158 and 160 vanishes so as to curtail the supply of field production supplied to the separator tank 10, when the leads 158 and 160 or the leads 154 and 158 are employed as discussed hereinbefore.

Figure 2:
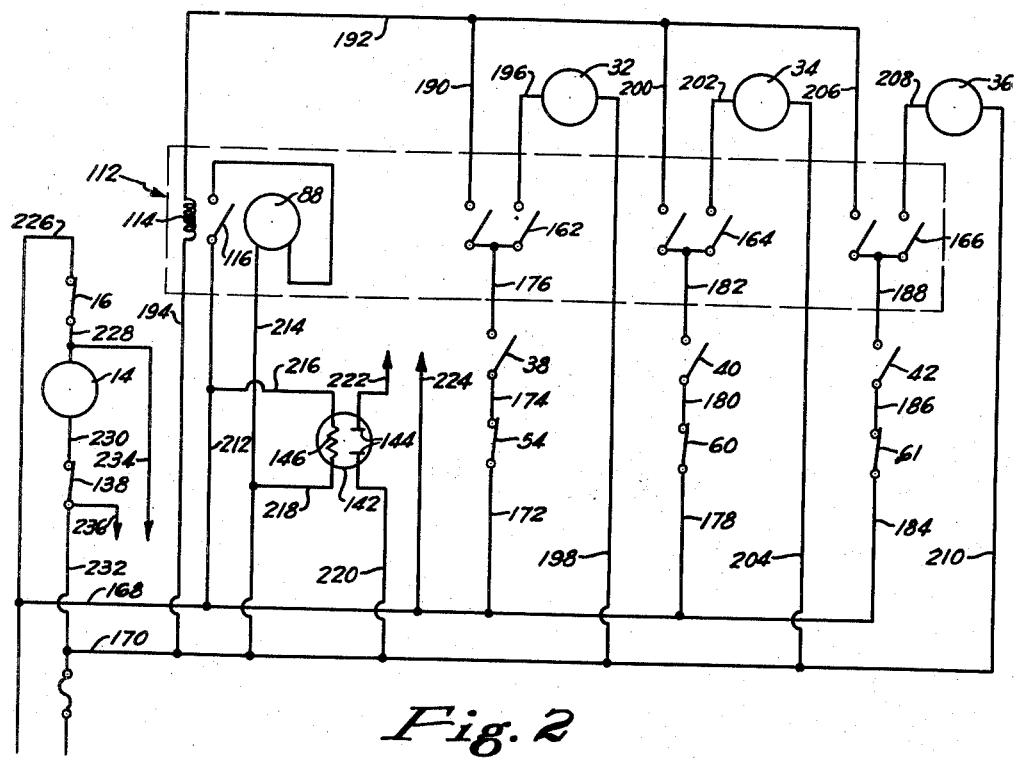
Figure 2 is an electrical diagram illustrating an alternative electrical arrangement to that shown in Figure 1.

Attention is now directed to the alternative electrical circuitry of Figure 2 that can be used as an alternative to that disclosed in Figure 1. In Figure 2, the numerals 14, 16, 32, 34, 36, 38, 40, 42, 54, 60, 61, 88, 112, 114, 116, 138, 142, 144, and 146 serve to designate the same elements as they designate in Figure 1, as the sole distinction between the two embodiments resides in the employment of different micro switches and different electrical circuitry.

The numerals 162, 164, and 166 designate normally open, double-pole micro switches, each of which can be considered a special form of a pair of switches. Such micro switches are arranged to be sequentially and cyclically closed during energization of the motor 88 in a manner perfectly analogous to that provided for the pairs of micro switches 62 and 64, 66 and 68, and 70 and 72 by cam means, not shown. The switches 162, 164, and 166 are so arranged with respect to such cam means that only one of the switches is ever closed at one time.

The electrical circuitry provided in Figure 2 comprises fused power leads 168 and 170. The liquid-level-responsive switch and the switch associated with the outlet valve of each of the tanks are connected to the power lead 168 in series with each other. With respect to such switches associated with the storage tank 26, such electrical circuitry takes the form of leads 172, 174, and 176, while the leads 178, 180, 182, 184, 186, and 188 are correspondingly arranged with the switches associated with the storage tanks 28 and 30, respectively.

The lead 176 is connected to the double-pole-micro switch 162, with one pole of the micro switch 162 being connected in series with solenoid 114 of the relay 112 to the power lead 170 by leads 190, 192, and 194, and the other pole of the micro switch 162 is connected in series with the valve 32 to the power lead 170 by leads 196 and 198. In an analogous fashion, the lead 182 is connected to the double-pole-micro switch 164 with the switch having one pole connected in series with the solenoid 114 to the power lead 170 by leads 200, 192, and 194, while the other pole of the micro switch 164 is connected in series with the valve 34 to the power lead 170 by leads 202 and 204. Also, the lead 188 is connected to the double-pole-micro switch 166 with one pole of the micro switch being connected in series with the solenoid 114 to the power lead 170 by leads 206, 192, and 194, while the other pole of the double-pole-micro switch 166 is connected in series with the valve 36 to the power lead 170 by leads 208 and 210.

The electric motor 88 is connected in series with the switch 116 of the relay 112 between the power leads 168 and 170 by leads 212 and 214, with the latter leads being respectively connected to the heater element 146 of the time-delay-amperite tube 142 by leads 216 and 218. One of the normally closed contacts 144 is connected to the power lead 170 by lead 220, while leads 222 and 224, which are connected respectively to the other contact 144 and the power lead 168, constitute leads corresponding in utility to the leads 154 and 156 of Figure 1 for controlling field production.

The valve 14, the liquid-level-responsive switch 16 and the manual switch 138 are connected in series between the power leads 168 and 170 by leads 226, 228, 230, and 232, so that the valve 14 is energized to its open position whenever the switch 16 and the switch 138 are both closed. A pair of leads 234 and 236 are connected to the leads 228 and 232, respectively, so that the leads 234 and 236 can be used to control field production in a manner analogous to that in which the leads 158 and 160 of Figure 1 can be used. Also, it will be noted that the leads 222 and 234 can be used to control field production in the same manner as previously described in connection with leads 154 and 158 of Figure 1.

The operation of the embodiment of the invention shown in Figure 2 will be readily understood. The motor 88 will be continuously energized to sequentially and cyclically close the double-pole-micro switches 162, 164, and 166 until one of such double-pole-micro switches has been closed that is associated with a storage tank having both its associated liquid-level-responsive switch closed and the switch associated with its outlet valve closed. For example, assuming the switch 54 and the switch 38 associated with storage tank 26 are closed, and that the electric motor 88 with its associated cam means, not shown, causes closure of the double-pole-micro switch 162, circuits are completed through the solenoid 114 and the valve 32. Energization of the solenoid 114 through its actuation of the normally closed switch 116 interrupts operation of the electric motor 88 thereby causing the double-pole-micro switch 162 to remain closed until such time as the solenoid 114 is de-energized. Energization of the inlet valve 32 allows crude oil to enter the storage tank 26, with valve 32 remaining open until such time as the liquid level within the tank has risen sufficiently to cause opening of the liquid-level-responsive switch 38. Upon opening of the liquid-level-responsive switch 38, both the circuits through the solenoid 114 and the inlet valve 32 are interrupted, and as a consequence of de-energization of the solenoid 114, the switch 116 closes causing energization of the electric motor 88, whereupon the latter causes opening of the double-pole-micro switch 162 followed by closing of the double-pole-micro switch 164. The further operation of the apparatus will be apparent to those skilled in the art.

As in the case of the embodiment of the invention shown in Figure 1, the embodiment of the invention disclosed in Figure 2 also possesses the property of being affected by a power failure only to the extent that the sequence of operations is merely suspended or interrupted for the duration of the power failure. The embodiment of the invention shown in Figure 2 also is adapted for use in connection with field production control apparatus such as shown in the previously mentioned pending application to control field production in the sense that the occurrence of either the separator tank becoming full or all the storage tanks becoming full to curtail the production of crude oil. In this latter connection, it will be understood that the time interval of energization of the heater element 146 of the amperite tube 142 required to cause the normally closed contacts 144 to open is slightly in excess of the time required for the electric motor 88 to have been continuously energized for a sufficient length of time to have completed closure of all of the double-pole-micro switches 162, 164, and 166.

In the embodiment of the invention shown in Figure 2, the micro switches 162, 164, and 166, as well as the relay 112 are immersed in transformer oil contained in a vapor-tight field receptacle, not shown, so as to minimize the deleterious effects of corrosion as well as to reduce the possibility of such electrical components causing ignition of inflammable vapors or the like.

An outstanding general advantage of the illustrated embodiments of the invention is the "fail safe" characteristics of the same. For example, one aspect of such characteristics will be seen upon reference to Figure 2, wherein such occurrences as burning out of the valve 32 or breakage of any of the leads 172, 174, 176, 190, 196, and 198 may only result in the filling of tank 26 being by-passed, and at worst result in curtailing the filling of the storage tanks and also curtailing field production.

The use of two micro switches in association with each storage tank is much preferred to the use of a single switch for the reason that the latter construction necessitates the inlet valves being in series with the solenoid and results in the difficulties inherent in such an arrangement.

The illustrated and described embodiment of the invention are subject to numerous variations within the scope of the invention. Attention is therefore directed to the appended claims for ascertaining the scope of the invention.

What is claimed is:

1. Apparatus for controlling the introduction of liquid into a plurality of storage tanks comprising a plurality of electrically controlled valves that are open solely during electrical energization thereof, a liquid-level-responsive-electric-switch means associated with each of the valves, a pair of normally open, electric-selector switches associated with each valve, switch-actuating means responsive to electrical energization thereof to sequentially and cyclically close the pairs of selector switches, an electric relay comprising a solenoid and a normally closed relay switch, electric-circuit means for controlling energization of the solenoid comprising an associated electric-circuit branch for each valve including in electrical series the switch means and one of the pair of selector switches associated with such valve, said circuit branches being in electrical parallel with each other and in electrical series with the solenoid, means for energizing the switch-actuating means comprising an electric circuit including in electrical series the switch-actuating means and the relay switch, and means for energizing the valves comprising a further electric circuit associated with each valve that includes in electrical series the valve, the switch means, and the other of the pair of switches associated with such valve.

2. The combination of claim 1 including an oil-containing, vapor-tight housing, said pairs of switches, relay and switch-actuating means being disposed in said housing.

3. The combination of claim 1, wherein said switch-actuating means comprises a cam and an electric motor drivingly connected to the cam.

4. The combination of claim 3, wherein said pairs of switches are micro switches in operative engagement with the cam.

5. The combination of claim 1, wherein each of said pairs of switches is a double-pole switch.

6. The combination of claim 1, wherein each of said further electric circuits has the valve electrically interposed between the other of the pair of selector switches and the switch means.

7. Liquid-storage apparatus comprising a plurality of storage tanks; each of said tanks having associated therewith a liquid-level-responsive-electric switch that is closed solely when the liquid level within the tank is below a predetermined level, each of said tanks having an inlet provided with an electrically controlled inlet valve that is open solely during electrical energization thereof, each of said tanks having a pair of normally open, electric-selector switches associated therewith; switch-actuating means responsive to electrical energization thereof to sequentially and cyclically close the pairs of selector switches; an electrical relay comprising a solenoid and a normally closed relay switch; electric circuit means for controlling energization of the solenoid comprising an associated electric-circuit branch for each tank including in electrical series the liquid-level-responsive switch and one of the pair of selector switches associated with such tank, said circuit branches being in electrical parallel with each other and in electrical series with the solenoid; means for energizing the switch-actuating means comprising an electric circuit including in electrical series the switch-actuating means and the relay switch; and means for energizing the inlet valves comprising a further electric circuit associated with each tank that includes in electrical series the inlet valve, the liquid-level-responsive switch, and the other of the pair of switches associated with such tank.

8. Liquid-storage apparatus comprising a plurality of storage tanks; each of said tanks having associated therewith a liquid-level-responsive-electric switch that is closed solely when the liquid level within the tank is below a predetermined level, each of said tanks having an inlet provided with an electrically controlled inlet valve that is open solely during electrical energization thereof, each of said tanks having an outlet provided with an outlet valve, with each outlet valve having operatively associated therewith an outlet electric switch that is closed solely when the outlet valve is closed, each of said tanks having a pair of normally open, electric-selector switches associated therewith; switch-actuating means responsive to electrical energization thereof to sequentially and cyclically close the pairs of selector switches; an electrical relay comprising a solenoid and a normally closed relay switch; electrical circuit means for controlling energization of the solenoid comprising an associated electric-circuit branch for each tank including in electrical series the outlet-electric switch, the liquid-level-responsive switch and one of the pair of selector switches associated with such tank, said circuit branches being in electrical parallel with each other and in electrical series with the solenoid; means for energizing the switch-actuating means comprising an electric circuit including in electrical series the switch-actuating means and the relay switch; and means for energizing the inlet valves comprising a further electric circuit associated with each tank that includes in electrical series the inlet valve, the liquid-level-responsive switch, the outlet switch, and the other of the pair of switches associated with such tank.

9. The combination of claim 7, including electric-switch means actuated in response to substantially continuous energization of the switch-actuating means for a predetermined-time interval.

10. The combination of claim 7, wherein each of said pairs of selector switches comprises a double-pole switch.

11. The combination of claim 7, wherein each of said further electric circuits has the inlet valve electrically interposed between the other of the pair of selector switches and the liquid-level-responsive switch.

12. Liquid-storage apparatus comprising a processing vessel having an inlet provided with an electrically controlled supply valve that is open solely during electrical energization thereof, said vessel having a liquid-level-controlled switch that is closed solely when the liquid level within the vessel is below a predetermined level, electrical-valve-energizing means comprising an electric circuit that includes said switch and said valve in electrical series; a plurality of storage tanks each provided with an inlet, said vessel having an outlet connected to the tank inlets for supplying liquid to the tanks, each of said tanks having associated therewith a liquid-level-responsive-electric switch that is closed solely when the liquid level within the tank is below a predetermined level, each of said tanks having an inlet provided with an electrically controlled inlet valve that is open solely during electrical energization thereof, each of said tanks having a pair of normally open, electric-selector switches associated therewith; switch-actuating means responsive to electrical energization thereof to sequentially and cyclically close the pairs of selector switches; an electrical relay comprising a solenoid and a normally closed relay switch; electric circuit means for controlling energization of the solenoid comprising an associated electric-circuit branch for each tank including in electrical series the liquid-level-responsive switch and one of the pair of selector switches associated with such tank, said circuit branches being in electrical parallel with each other and in electrical series with the solenoid; means for energizing the switch-actuating means comprising an electric circuit including in electrical series the switch-actuating means and the relay switch; means for energizing the inlet valves comprising a further electric circuit associated with each tank that includes in electrical series the inlet valve, the liquid-level-responsive switch, and the other of the pair of switches associated with such tank; normally closed, electric-switch means that open in response to substantially continuous energization of the switch-actuating means for a predetermined-time interval; and means adapted to control the supply of liquid to the vessel comprising said liquid-level-controlled switch and the electric-switch means.

References Cited in the file of this patent

UNITED STATES PATENTS

| | | |
|---|---|---|
| 2,605,780 | Nance | Aug. 5, 1952 |
| 2,751,924 | Hynd | June 26, 1956 |
| 2,769,455 | Massey et al. | Nov. 6, 1956 |